UNITED STATES PATENT OFFICE.

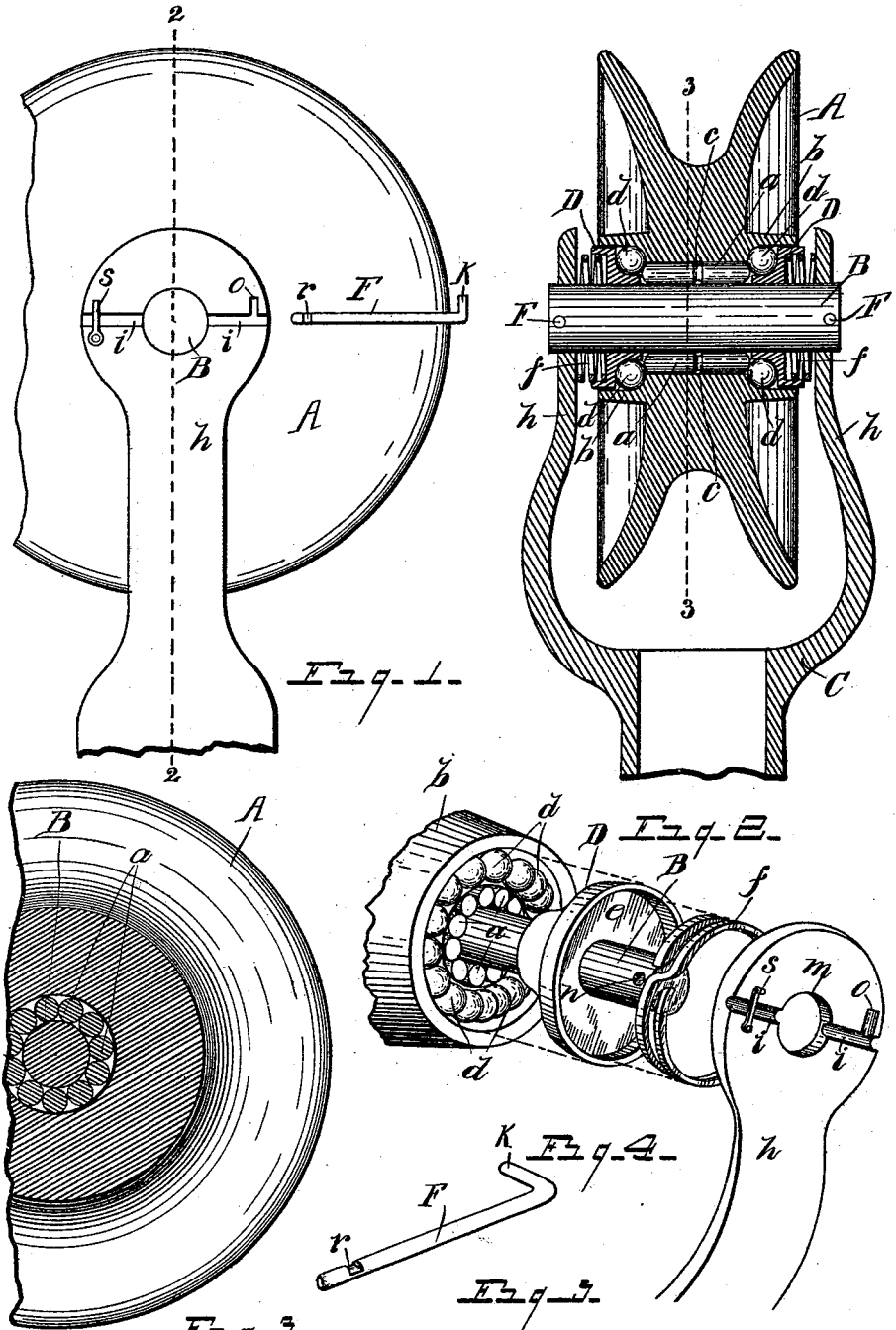

EDWARD MARTYN, OF DETROIT, MICHIGAN.

ELECTRIC-RAILWAY TROLLEY.

SPECIFICATION forming part of Letters Patent No. 494,721, dated April 4, 1893.

Application filed September 19, 1892. Serial No. 446,313. (No model.)

*To all whom it may concern:*

Be it known that I, EDWARD MARTYN, a citizen of the United States, residing at Detroit, in the county of Wayne, State of Michigan, have invented certain new and useful Improvements in Electric Trolleys; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in electric trolleys, and consists in a certain construction and arrangement of parts, as hereinafter fully set forth, the essential features of which being pointed out particularly in the claims.

The objects of the invention are to produce a trolley of simple construction, in which a perfect contact is effected and the friction of running reduced to the minimum, and in which provision is made for a slight lateral adjustment of the trolley-wheel upon its spindle, so that said wheel may readily adjust itself to the conductor. These objects are attained by the mechanism illustrated in the accompanying drawings, in which—

Figure 1 is a side elevation of the trolley-wheel, and fork in which it is mounted, showing the manner of securing in the fork, the spindle on which said wheel is mounted. Fig. 2 is a vertical section line 2—2 of Fig. 1. Fig. 3 is a section on line 3—3 of Fig. 2. Fig. 4 is an enlarged detail, in perspective, of the bearing parts, detached. Fig. 5 is a view of the key for locking the spindle of the trolley-wheel, to the forks.

Referring to the letters of reference, A designates the peripherally grooved trolley-wheel, which travels in contact with the line conductor, said wheel being mounted on the spindle B, which is supported at its ends in the arms of the fork C, which is adapted to be attached to the trolley-pole, not shown. Located around the spindle B within the aperture through the hub of said wheel, is a series of rollers $a$ that fill the space between the periphery of said spindle and the wall of the aperture of the hub, thereby forming an anti-friction contact, that effects a continuity of the circuit through said wheel and spindle, and through the forks to the motor on the car, as common, said rollers having a groove $c$ in their peripheries for holding the oil used for lubricating said parts.

The hub $b$ of the wheel A, at each end is provided with an annular recess having a circular way in which is located a series of balls $d$. Mounted on the spindle B, so as to slide horizontally thereon, and entering the recesses in the ends of the hub $b$ are the cones D which are held in contact with the balls $d$, within the hub, by means of the coiled springs $f$, which lie in the recess $e$ in the outer faces of said cones, and bear against the arms $h$ of the fork. This forcing of the cones D against the balls, causes said balls to bear upon the concave peripheries of said cones, and confines them between the cones and the annular recess in the hub of the wheel A, thereby effecting a ball-bearing for said wheel, and by means of the springs $f$ interposed between said forks and the movable cones, provision is made for the free lateral play of the trolley-wheel on its spindle, as when passing a switch, or by the swaying of the trolley-pole, thus obviating undue wear upon the bearings, the tension of said springs maintaining a yielding contact between the bearing parts. In the outer faces of the arms $h$ of the fork, is a transverse way $i$ which crosses the central aperture $m$ therethrough that receives the end of the spindle B, which is provided with a hole $n$ that registers with the way in said arm.

F indicates a key, adapted to be received in the way $i$ and to pass through the hole $n$ in the end of the spindle said key being provided with the angle end portion $k$ that is adapted to lie in the recess $o$ in the face of said arm which communicates with the way $i$, the opposite end of said key, having a notch $r$ that receives the spring $s$, when the portion $k$ of the key is turned so as to lie in the recess $o$, thereby securely locking said spindle to the arms of the fork, and in such manner as to enable said spindle to be readily removed when desired.

Having thus fully set forth my invention, what I claim as new, and desire to secure by Letters Patent, is—

1. In an electric-trolley, the combination of the trolley-wheel having an apertured hub, said hub having a recess in each end thereof around said aperture, the balls located in said recess, the spindle passing through said hub, the cones loosely mounted on said spindle and adapted to extend into the recess in the ends of said hub, and the springs bearing against said cones to hold them in contact with said balls.

2. In a trolley, the combination of the trolley-wheel having an apertured hub provided with recesses in the ends thereof, the spindle passing through said hub of less diameter than the aperture therein, the series of rollers located around said spindle within said hub, the balls located in the recesses in the ends of the hub, the cones movably mounted on said spindle adapted to enter said recesses and bear against the balls therein, and the springs for maintaining said cones in contact with said balls.

3. In a trolley, the combination of the trolley-wheel having an apertured hub provided with recesses in the ends thereof, the spindle passing through said aperture, the balls located in the recess in said hub, the cones mounted adjustably upon said spindle and adapted to enter said recesses and bear against said balls therein, said cones being provided with recesses in their outer faces, the coiled springs lying in said recess, whereby said cones are held in yielding contact with said balls, and all of the bearing parts are permitted to move longitudinally upon said spindle.

4. In a trolley, the combination of the trolley-wheel, the spindle on which said wheel is journaled, said spindle having an aperture in its outer end, the arm or bracket supporting said spindle, said arm having a way therein that is adapted to register with said aperture in the end of said spindle, said way having a communicating recess at one end, the spring crossing said way at the other end, the key adapted to be inserted in said way and through the aperture in the end of the spindle, said key having the bent end portion adapted to lie in the recess communicating with said way, and having the notch to receive said spring when the key is locked.

5. In a trolley, the combination of the trolley-wheel, having an apertured hub, the spindle passing through said hub of less diameter than the aperture therein, the series of rollers located around said spindle within said hub, the cones movably mounted on said spindle adapted to enter said apertures in the hub and lie adjacent to the ends of said rollers therein, the brackets supporting the outer ends of said spindle, the springs mounted on said spindle between said brackets and cones, whereby said cones are held yieldingly in proximity to the ends of the rollers within the hub to retain them in place, and permit of the lateral movement of the trolley-wheel on said spindle.

6. In a trolley, the combination of the trolley wheel, the spindle passing freely through said wheel, the trolley forks supporting said spindle, the series of rollers around said spindle filling the space between its periphery and the inner wall of the aperture through said wheel, thereby effecting a continuity of the circuit through said wheel, spindle and forks, the washers or cones on said spindle adjacent to the ends of said rollers to retain them in place, substantially as set forth.

In testimony whereof I affix my signature in presence of two witnesses.

EDWARD MARTYN.

Witnesses:
E. S. WHEELER,
H. R. WHEELER.